United States Patent
Isomura et al.

(10) Patent No.: US 7,885,191 B2
(45) Date of Patent: Feb. 8, 2011

(54) LOAD BALANCE SERVER AND METHOD FOR BALANCING LOAD OF PRESENCE INFORMATION

(75) Inventors: Manabu Isomura, Saitama (JP); Naoki Imai, Saitama (JP); Kazuyuki Tasaka, Saitama (JP); Akira Idoue, Saitama (JP)

(73) Assignee: KDDI R&D Laboratories Inc., Fujimino-shi, Saitama (JP)

( * ) Notice: Subject to any disclaimer, the term of this patent is extended or adjusted under 35 U.S.C. 154(b) by 159 days.

(21) Appl. No.: 12/142,219

(22) Filed: Jun. 19, 2008

(65) Prior Publication Data

US 2009/0010163 A1   Jan. 8, 2009

(30) Foreign Application Priority Data

Jul. 3, 2007   (JP) .............................. 2007-174983

(51) Int. Cl.
*H04L 12/26*   (2006.01)
(52) U.S. Cl. ........................ 370/235; 709/203; 709/224; 709/225
(58) Field of Classification Search .................. 370/235
See application file for complete search history.

(56) References Cited

U.S. PATENT DOCUMENTS

| | | | |
|---|---|---|---|
| 2004/0024861 A1* | 2/2004 | Coughlin | 709/224 |
| 2004/0059781 A1* | 3/2004 | Yoakum et al. | 709/204 |
| 2005/0193010 A1* | 9/2005 | DeShan et al. | 707/104.1 |
| 2006/0013147 A1* | 1/2006 | Terpstra et al. | 370/252 |
| 2006/0167978 A1* | 7/2006 | Ozugur et al. | 709/203 |

OTHER PUBLICATIONS

"Session Initiation Protocol (SIP)—Specific Event Notification," RFC3265; pp. 3-4; Jun. 2002.
"Session Initiation Protocol (SIP) Extension for Event State Publication," RFC3903; pp. 5-10; Oct. 2004.
"A Presence Event Package for the Session Initiation Protocol (SIP)," RFC3856; pp. 7-10; Aug. 2004.
"Presence service using the IP Multimedia (IM) Core Network (CN) subsystem; Stage 3 (Release 7)," 3GPP TS 24.141 V7.3.0; Dec. 2006; pp. 11-16.
Vishal K. Singh et al; "Presence Scalability Architectures," Department of Computer Science, Columbia University; Feb. 2006.

* cited by examiner

*Primary Examiner*—Jason E Mattis
*Assistant Examiner*—Stephen J Clawson
(74) *Attorney, Agent, or Firm*—Westerman, Hattori, Daniels & Adrian, LLP

(57) ABSTRACT

A load balance server has a first database for recording a list of identifiers of the presence servers, a second database for recording a subscription message receiving rate, an entry retrieval means for selecting a presence server that the subscription message receiving rate is lowest, in presence servers included in the list of the entry based on the presence information, a presence server selecting means for selecting an additional presence server whichever subscription message receiving rate is lower than predetermined threshold Ts, when the subscription message receiving rate in the selected presence server is higher than predetermined threshold Ts, and a message sending/receiving control means for sending the public message to the selected presence server.

8 Claims, 9 Drawing Sheets

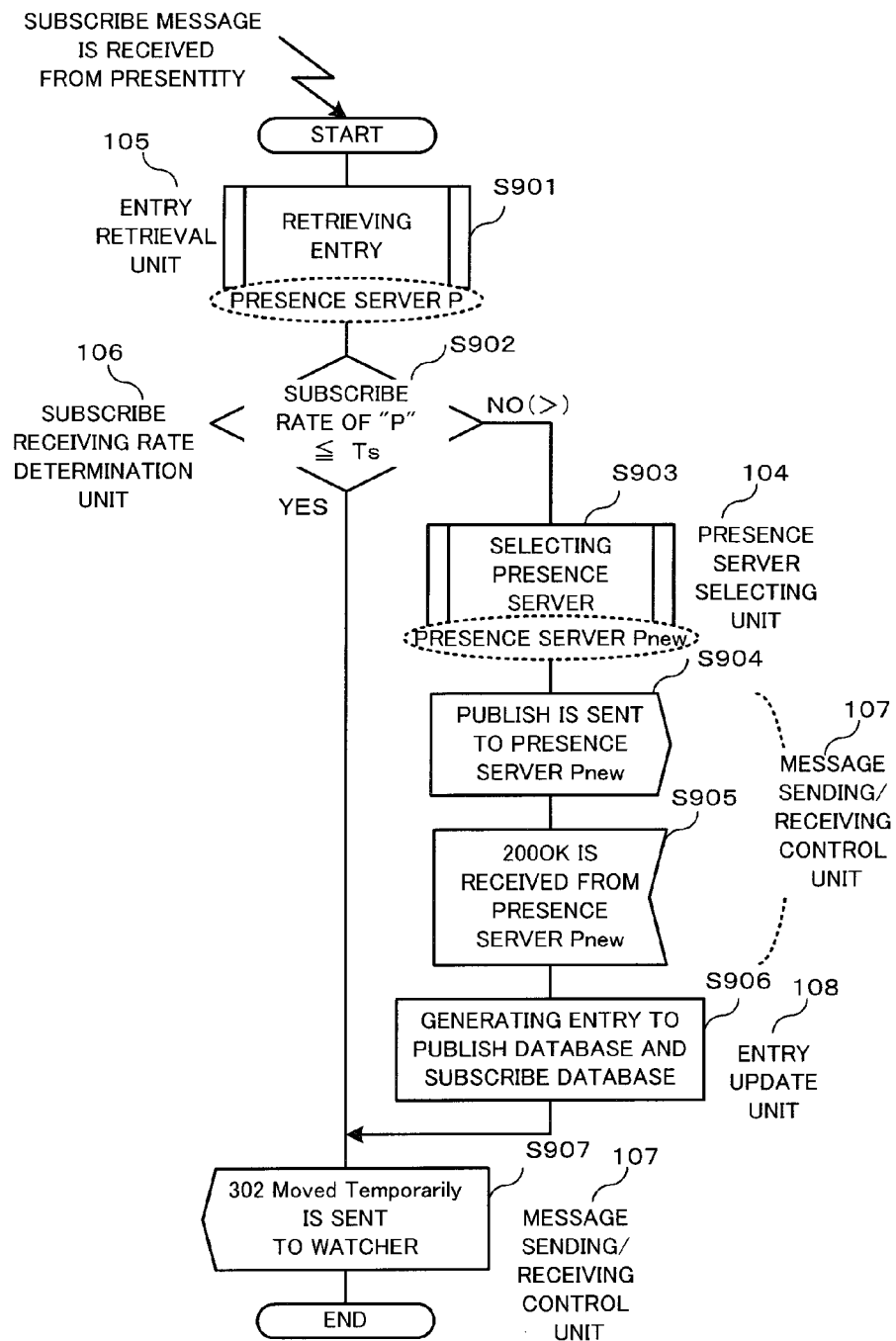

US 7,885,191 B2

1

LOAD BALANCE SERVER AND METHOD FOR BALANCING LOAD OF PRESENCE INFORMATION

PRIORITY CLAIM

The present application claims priority from Japanese Patent Application No. 2007-174983 filed on Jul. 3, 2007, which is incorporated herein by reference.

BACKGROUND OF THE INVENTION

1. Field of the Invention

The present invention relates to a presence system using SIP (Session Initiation Protocol)/SIMPLE (SIP for Instant Messaging and Presence Leveraging Extensions). In particular, it relates to a load balance server and a method for balancing load of presence information (presence state).

2. Description of the Related Art

SIMPLE is a technology developed from SIP to realize an instant message and a presence service, according to (1) "Session Initiation Protocol (SIP)—Specific Event Notification", RFC3265, (2) "Session Initiation Protocol (SIP) Extension for Event State Publication", RFC3903 and (3) "A Presence Event Package for the Session Initiation Protocol (SIP)", RFC3856.

According to the presence service, one user terminal's status (for example, "on-line", "off-line", "busy" or "absent") is push-sent to other user terminal. Not only the user status but also the presence information of efficiency or position in the terminal is sent.

Further, 3GPP (3rd Generation Partnership Project) is standardizing a presence system in IMS (IP Multimedia Domain) using SIP/SIMPLE, according to (4) "Presence service using the IP Multimedia (IM) Core Network (CN) subsystem; Stage 3 (Release 7)", 3GPP TS 24.141 V7.3.0 (2006-12).

FIG. 1 is a system configuration diagram of presence system in the prior art.

According to FIG. 1, a plurality of user terminals communicates with one presence server 2. A plurality of user terminals has a presentity function and/or a watcher function. "Presentity" means "Presence+Entity", and shows an ownership of the presence information. "Watcher" means "SUBSCRIBER", and corresponds to "presentity".

(S101) Presentity 3 generating presence information sends PUBLISH message to register presence information to presence server 2. Correspondingly, the presence server 2 sends back a 200OK message to the presentity 3. The registration of the presence information is managed in soft-state. Thus, the presence server 2 cancels a registration of the presence information unless a PUBLISH message of re-registration (RE-FRESH) is received in effective period.

(S102) It is assumed that a user operating watcher 4 wants to subscribe to presence information in presentity 3 had by other users. Then, watcher 4 sends a SUBSCRIBE message for requiring subscription of the presence information in presentity 3 to presence server 2. Correspondingly, the presence server 2 sends back a 200OK message to watcher 4.

The presence information is identified by a combination of PRS-URI (PReSence-Uniform Resource Identifier, identifier for the presence information of the presentity) and Event (event name, event package). The subscription of the presence information is also managed in soft-state. Thus, presence server 2 cancels the subscription of the presence information unless a SUBSCRIBE message is received in effective period. In the case of re-subscription, a SUBSCRIBE message including the dialogue same as the subscription of the

2 first time must be sent. That is to say, id parameters of header fields of To tag, From tag, Call-ID and Event must be the same.

(S103) After receiving the SUBSCRIBE message, the presence server 2 sends back an NOTIFY message including the presence information to watcher 4. Correspondingly, the watcher 4 sends back a 200OK message to presence server 2.

Also, there is the case that presentity 3 sends a PUBLISH message for modifying (MODIFY) the presence information to presence server 2. In this case, an NOTIFY message including updated presence information is sent to all watchers 4 subscribing the presence information.

According to the previously described presence system, when presence information is increased, a load of the presence server and the network is increased, too. Specifically, when there are a great number of the transmission of PUBLISH messages including the presence information, the number of the transmission of NOTIFY messages is also increased. In particular, when there are a great number of the transmission of SUBSCRIBE messages for one presence information, the number of the transmission of NOTIFY messages for one PUBLISH message is also increased.

The number of NOTIFY messages=number of SUB-
SCRIBE messages*number of PUBLISH messages When the number of user terminals is increased, expansibility in the presence system is limited.

Conventionally, there are layer 7 switches controlling transmission route based on the frame header of SIP message to realize load balance. When this is applied to a presence system, for example, every PRS-URI and Event, the PUBLISH message including the presence information can be sent to the presence server by path control.

However, the watcher must send a SUBSCRIBE message to the presence server that registers the presence information by the PUBLISH message because other presence servers do not store the presence information. Thus, a lot of SUBSCRIBE messages are sent intensively to the presence server that stores a specific presence information. That is to say, there is a problem that the presence server becomes a heavy-loaded.

BRIEF SUMMARY OF THE INVENTION

It is an object of the present invention to provide a load balance server for balancing load of the presence information for a system having a plurality of presence servers.

The present invention is based on a load balance server for communicating with first communication apparatus, second communication apparatus and a plurality of presence servers. The first communication apparatus sends a public message to register presence information. The second communication apparatus sends a subscription message subscribing presence information. The presence server registers presence information included in the received public message, and a report message including the presence information is sent to the source apparatus of a received subscription message, and sends a report message including the presence information to the source apparatus of the received subscription message.

According to the present invention, the load balance server has a first database for recording a list of identifiers of the presence servers that registered the presence information with an entry, a second database for recording a subscription message receiving rate for each presence server, an entry retrieval means for selecting a presence server that the subscription message receiving rate is lowest, in presence servers included in the list of the entry based on the presence information, when the subscription message or the public message is received, a presence server selecting means for selecting an additional presence server whichever subscription message receiving rate is lower than predetermined threshold Ts, when the subscription message receiving rate in the selected presence server is higher than predetermined threshold Ts, and a message sending/receiving control means for sending the public message to the selected presence server.

It is preferred that the server is equipped in a presence system using SIP/SIMPLE, the public message is PUBLISH message, the subscription message is SUBSCRIBE message, the report message is NOTIFY message, the first database is publish database, and the second database is subscribe database.

It is preferred that the presence server selecting means is for selecting a presence server from the plurality of presence servers using a corresponding hash value into which part of the presence information is converted using a hash function, determining whether a subscription message receiving rate of the selected presence server is lower than predetermined threshold Ts, and repeating the selecting of the presence server until the determination becomes the truth.

It is preferred that, when the subscription message is sent from the second communication apparatus to the presence server, the message sending/receiving control means sends back a re-direct request including the address of the presence server to the second communication apparatus, sends a subscription message to the presence server by using DSR method, or sends a subscription message to the presence server by using NAT method.

It is preferred that, when the subscription message is received, and correspondingly a public message is sent to the additional presence server, the message sending/receiving control means sends the subscription message to either one presence server included in a list of entry based on the presence information, receives presence information from the presence server by the report message, and sends the public message including the presence information to the additional presence server.

It is preferred that, when the public message is received, and correspondingly a public message is sent to the additional presence server, the message sending/receiving control means sends public message to all presence servers included in a list of the entry based on the presence information, and sends public message to the additional presence server.

It is preferred that the second database further includes effective period in each presence information, and the entry retrieval means deletes the presence servers that the effective period of the subscription message stored in the second database expires for current time.

The present invention is based on a method for making a computer to function as a load balance server for communicating with first communication apparatus, second communication apparatus and a plurality of presence servers. The first communication apparatus sends a public message to register presence information. The second communication apparatus sends a subscription message subscribing presence information. The presence server registers presence information included in the received public message, and a report message including the presence information is sent to the source apparatus of a received subscription message, and sends a report message including the presence information to the source apparatus of the received subscription message.

The load balance server has a first database for recording a list of identifiers of the presence servers that registered the presence information with an entry, and a second database for recording a subscription message receiving rate to each presence server.

According to the present invention, the method has the steps of selecting a presence server that the subscription message receiving rate is lowest, in presence servers included in the list of the entry based on the presence information, when the subscription message or the public message is received, selecting an additional presence server whichever subscription message receiving rate is lower than predetermined threshold Ts, when the subscription message receiving rate in the selected presence server is higher than predetermined threshold Ts, and sending the public message to the selected presence server.

Thus, according to the load balance server of the present invention, even if a lot of SUBSCRIBE messages to the specific presence information are sent intensively, load of the presence information is balanced by increasing the number of presence servers to register the presence information.

BRIEF DESCRIPTION OF THE SEVERAL VIEWS OF THE DRAWINGS

FIG. 9 is a flow chart of the load balance server when a SUBSCRIBE message is received.

DETAILED DESCRIPTION OF THE INVENTION

Figure 1:
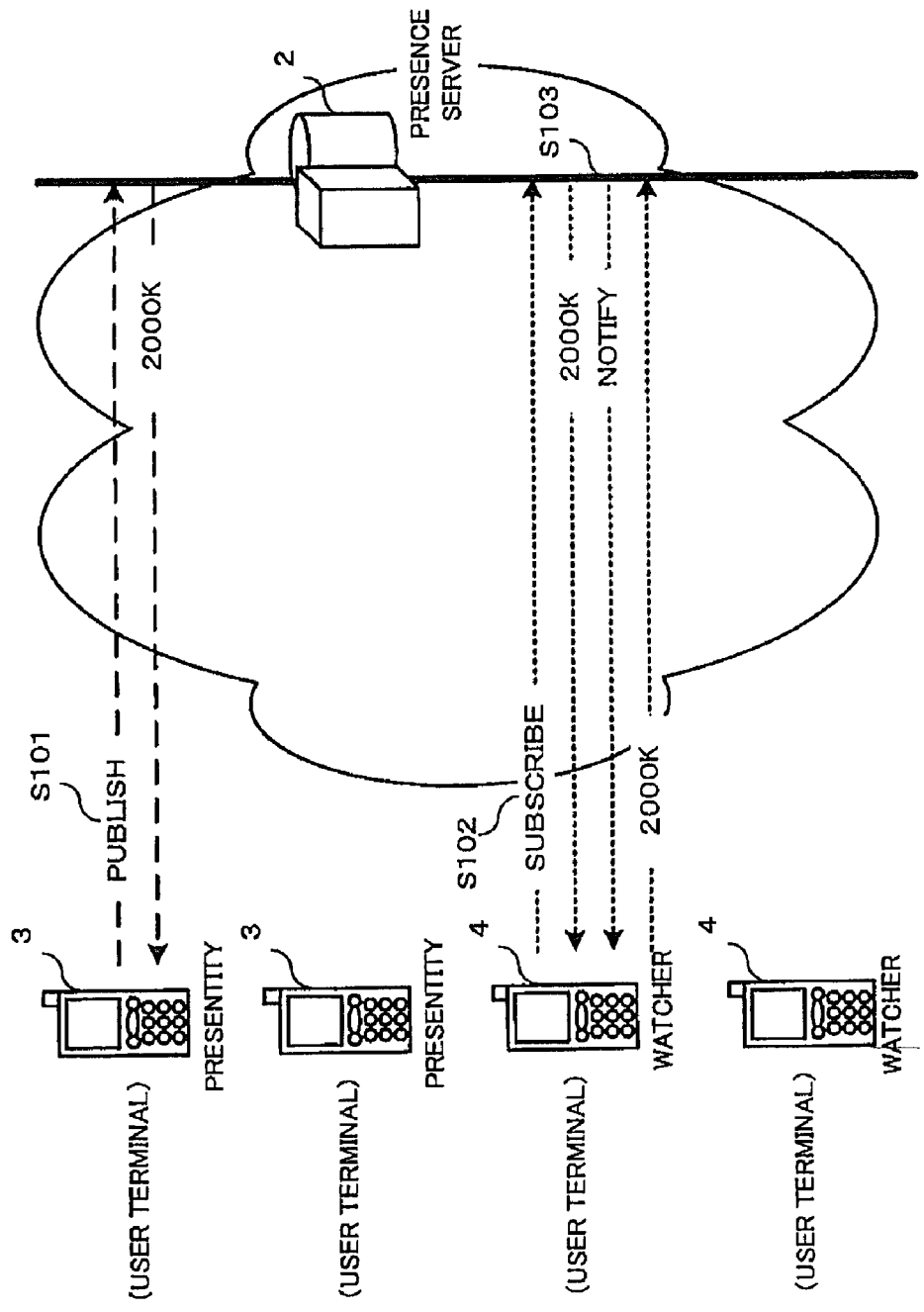
FIG. 1 is a configuration diagram of the presence system in the prior art.
Figure 2:
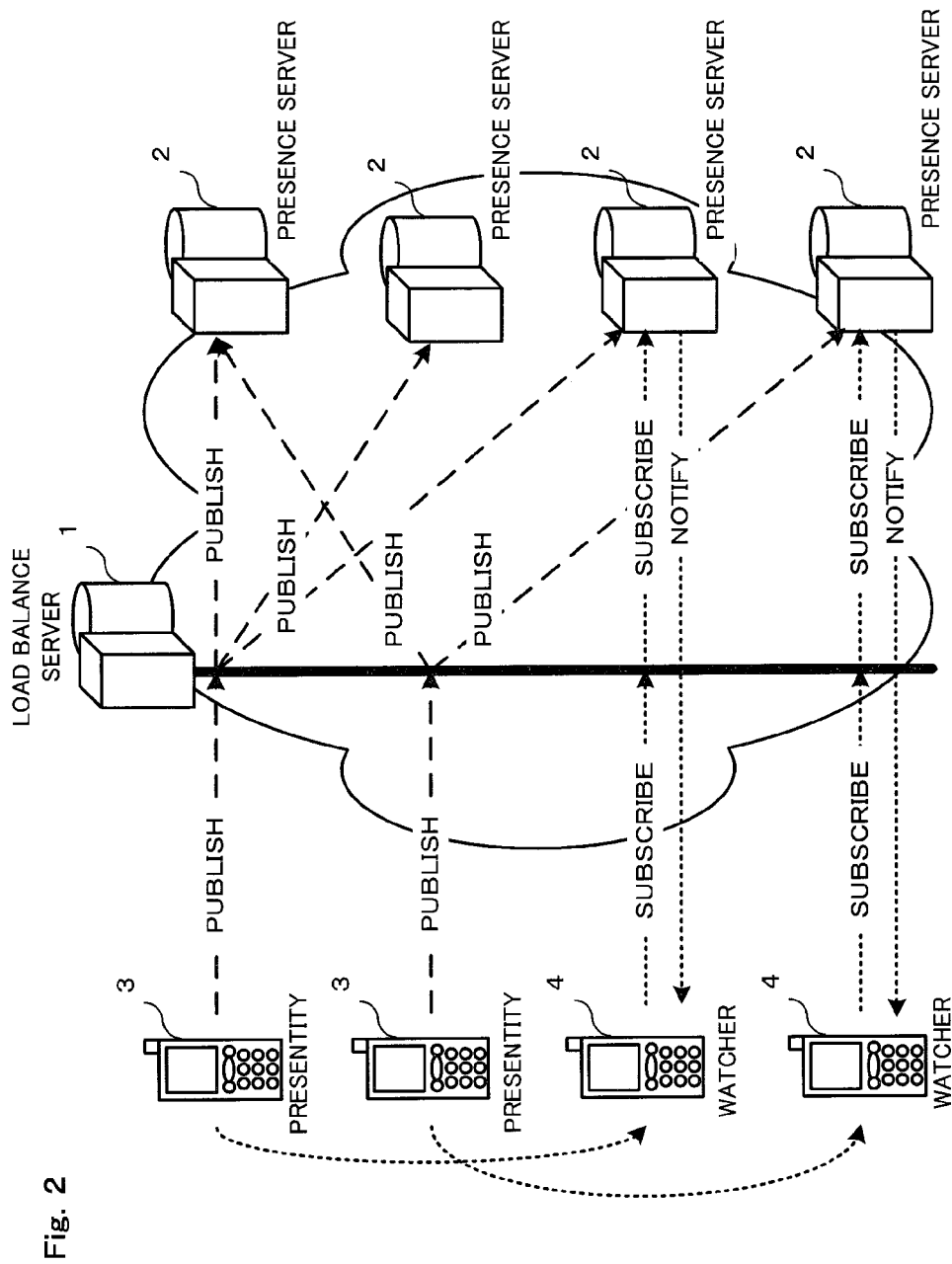
FIG. 2 is a system configuration diagram in the present invention.

FIG. 2 is a system configuration diagram in the present invention.

An important component of the present invention is a load balance server 1 included in a presence system using SIP/SIMPLE. According to FIG. 2, a plurality of user terminals functioning as presentity or watcher communicates with load balance server 1. Load balance server 1 is connected to a plurality of presence servers 2 through a network. Load balance server 1 registers presence information with a plurality of presence servers. Therefore, SUBSCRIBE messages in the presence system is balanced.

Load balance server 1 of the present invention receives a PUBLISH message including the presence information from presentity 3. Then, necessity of the load balance is determined from the number of received messages in the presence server. When it is decided that load balance is necessary, load balance server 1 sends PUBLISH messages to a plurality of presence servers 2. Therefore, the presence information is registered by a plurality of presence servers 2.

Load balance server 1 also receives a SUBSCRIBE message from watcher 4. Then, route controlling is executed so that load does not concentrate on a specific presence server 2. Specifically, the SUBSCRIBE message is sent to a light-load presence server.

For example, load balance server 1 sends back a re-direct request including an address of the presence server to watcher 4. Or it sends a SUBSCRIBE message to the presence server by the DSR method or the NAT method. Therefore, presence server 2 can transfer an NOTIFY message including the presence information to watcher 4. Watcher 4 sends a SUBSCRIBE message to existing presence server 2 through load balance server 1. Watcher 4 works to communicate directly with existing presence server 2.

Load balance server 1 stores a list of identifiers (presence server URI, for example, SIP-URI) of all presence servers 2. According to the present invention, when a lot of SUBSCRIBE messages are required to a specific presence information, the number of presence server 2 to register the presence information with is increased. Therefore, a load to concentrate on a specific presence server 2 is balanced.

Figure 3:
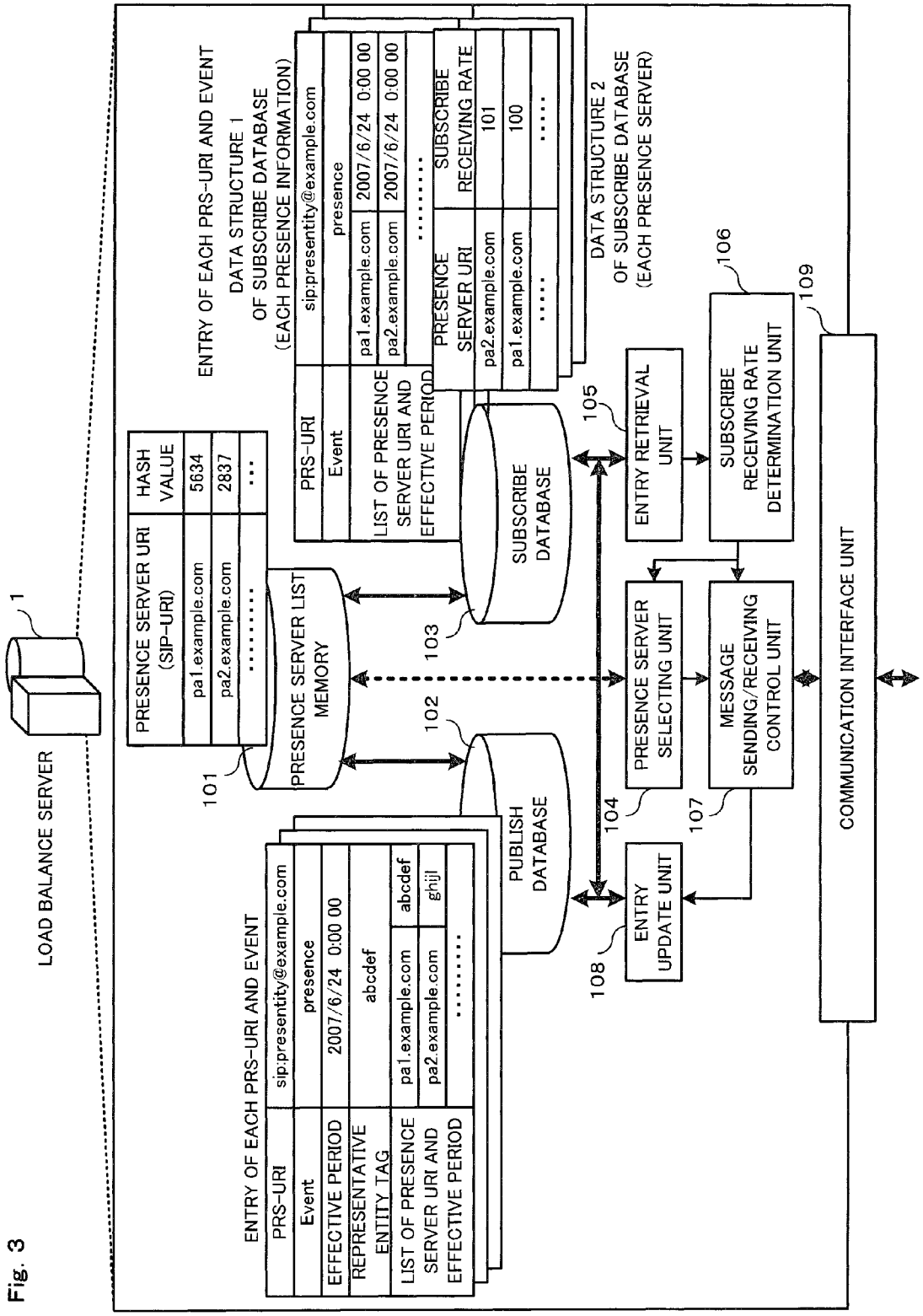
FIG. 3 is a functional configuration diagram of the load balance server in the present invention.

FIG. 3 is functional configuration diagram of the load balance server in the present invention.

Load balance server 1 has presence server list memory 101, publish database 102 and subscribe database 103.

Presence server list memory 101 stores presence server URIs (SIP-URI) of all available presence servers and hash values corresponding to the URI. The hash value is a value provided from a hash function of argument "SIP-URI".

Publish database 102 records an entry every presence information. The entry is generated by every identifier (PRS-URI) and event name (Event) of the presence information in the presentity. The entry includes a list of SIP-URIs of the presence servers that the presence information is registered.

Publish database 102 stores the following data structure of the entry.

TABLE 1

| DATA STRUCTURE OF PULISH DATABASE | |
|---|---|
| PRS-URI | sip: presentity@example.com |
| EVENT NAME | presence |
| EFFECTIVE PERIOD | 2007/6/24 0:00 00 |
| REPRESENTATIVE ENTITY TAG: SIP-ETag | abcdef |
| LIST OF PRESENCE SERVER URI AND EFFECTIVE PERIOD | pa1.example.com    abcdef |
| | pa2.example.com    ghijel |
| | . . . |

According to Table 1, every PRS-URI and Event (for example, presence), there are "effective period", "representative entity tag" and "list of presence server URI and entity tag".

"Effective period" is a period of time that the presence information is registered in the presence server. "Representative entity tag" is a value of the "Expires" header field in the 200OK message sent back to the presentity. "Entry list" is a list of SIP-URI and the entity tag of the presence servers to register the presence information.

Subscribe database 103 records SUBSCRIBE receiving rate for each presence server. The data structure stored by subscribe database 103 is different by the 302 Moved Temporarily method or the DSR/NAT method.

The 302 Moved Temporarily method applies code for HTTP re-direct (Hyper Text Transfer Protocol-re-direct) from Web server, to a SIP response message. This means that the page is in another place temporarily. According to HTTP, Web browser of user terminal recognizes this cord automatically, and re-direct former URL is read. When this is applied to SIP, SUBSCRIBE messages and NOTIFY messages between watcher 4 and presence server 2 are sent/received directly. That is to say, these messages do not pass through load balance server 1. According to the DSR method, a server answers directly.

According to the NAT method, an address is rewritten.

In the case of the 302 Moved Temporarily method, subscribe database 103 stores the following data structure:

TABLE 2

(302 Moved Temporarily METHOD)

| DATA STRUCTURE 1 OF SUBSCRIBE DATABASE (EACH PRESENCE INFORMATION) | | |
|---|---|---|
| PRS-URI | sip: presentity@example.com | |
| EVENT NAME | presence | |
| LIST OF PRESENCE SERVER URI AND EFFECTIVE PERIOD | pa1.example.com | 2007/6/24 0:00 00 |
| | pa2.example.com | 2007/6/24 0:10 00 |
| | . . . | |

| DATA STRUCTURE 2 OF SUBSCRIBE DATABASE (EACH PRESENCE SERVER) | |
|---|---|
| PRESENCE SERVER URI | SUBSCRIBE RECEIVING RATE |
| pa2.example.com | 101 |
| pa1.example.com | 100 |
| . . . | . . . |

The data structure 1 has a list of "presence server URI" and "effective period" in each PRS-URI and Event. Here, the effective period shows the longest effective period in the effective periods of the SUBSCRIBE messages of the presence information for each presence server.

Also, the data structure 2 has SUBSCRIBE receiving rate in each presence server's URI. The SUBSCRIBE receiving rate means the number of SUBSCRIBE messages per unit of time. Therefore, a determination is enabled based on the number of generated SUBSCRIBE messages.

Further, in the case of the DSR/NAT method, subscribe database 103 stores the following data:

TABLE 3

(DSR/NAT METHOD)

| DATA STRUCTURE 1 OF SUBSCRIBE DATABASE (EACH PRESENCE INFORMATION) | | | | | |
|---|---|---|---|---|---|
| PRS URI | sip:presentity@example.com | | | | |
| EVENT NAME | Presence | | | | |
| PRESENCE SERVER URI, EFFECTIVE | pa1.example.com | 2007/6/24 0:00 00 | abcd 1234 | 12345 678 | 12345678@host.example.com |

TABLE 3-continued (DSR/NAT METHOD)

| PERIOD, DIALOG (To tag, From tag, Call ID) | pa2.example.com | 2007/6/24 0:10 00 | 1234 abcd | 87654 321 | 87654321@host.example.com |
|---|---|---|---|---|---|
| ... | | | | | |

DATA STRUCTURE 2 OF SUBSCRIBE DATABASE (EACH PRESENCE SERVER)

| PRESENCE SERVER URI | THE TOTAL NUMBER OF SUBSCRIBES |
|---|---|
| pa1.example.com | 1000 |
| pa2.example.com | 1100 |
| ... | ... |

The data structure 1 records the combination of Event, dialogue (To tag, From tag, Call-ID), effective period and presence server identifier of the presence information in the SUBSCRIBE message sent to a presence server.

Also, the data structure 2 records the total number of the SUBSCRIBE messages for each presence server. The DSR/NAT method uses the total number of subscribes that are counted effective dialogues instead of SUBSCRIBE receiving rate.

Further, load balance server 1 has presence server selecting unit 104, entry retrieval unit 105, SUBSCRIBE receiving rate determination unit 106, message sending/receiving control unit 107, entry update unit 108 and communication interface unit 109. These function units are realized by executing a program that makes a computer carried in a server operate.

When the SUBSCRIBE receiving rate based on the presence server is higher than predetermined threshold Ts, presence server selecting unit 104 selects an additional presence server having a SUBSCRIBE receiving rate which is lower than Ts.

For the presence servers in the entry based on the presence information, entry retrieval unit 105 selects the presence server that SUBSCRIBE receiving rate is the lowest.

SUBSCRIBE receiving rate determination unit 106 determines whether SUBSCRIBE receiving rate in the presence server is lower than predetermined threshold Ts.

Message sending/receiving control unit 107 changes messages among presence servers 2, presentities 3 and watchers 4.

Further, the detailed action of each functional unit is shown by flow charts in FIG. 8 and FIG. 9 to be described below.

Figure 4:
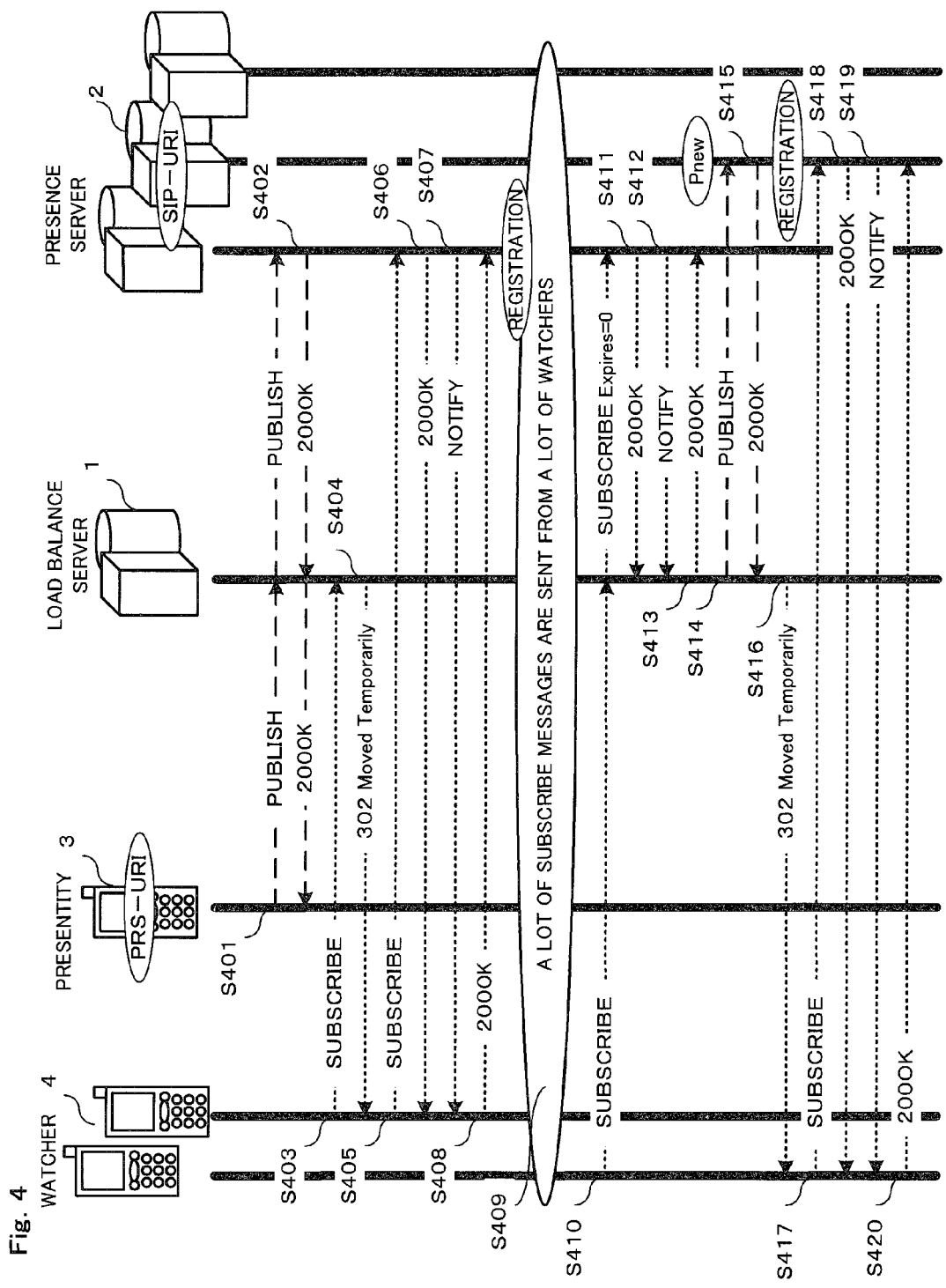
FIG. 4 is the first sequence diagram in the present invention.

FIG. 4 is the first sequence diagram in the present invention.

(S401) First, a presentity 3 to register presence information sends a PUBLISH(INITIAL) message to load balance server 1. Load balance server 1 selects presence server P that the presence information should be registered. The presence server P is the server that SUBSCRIBE receiving rate is less than predetermined threshold Ts. And, the PUBLISH(INITIAL) message is sent to the presence server 2. Therefore, the presence server 2 registers the presence information of the presentity 3.

It is an example of this PUBLISH message's format as follows:

| PUBLISH sip:presentity@example.com | [PRS-URI] |
|---|---|
| SIP/2.0 Via SIP/2.0/UDP | |
| Event: | [EVENT NAME] |
| To:<sip:presentity@example.com> | [PRS-URI] |
| From:<sip:presentity@example.com> | [PRS-URI] |
| Expires: | [EFFECTIVE PERIOD OF REGISTRATION] |
| Call-ID: | |
| CSeq: 1 PUBLISH | |

(S402) Correspondingly, the presence server 2 sends back a 200OK message to the load balance server 1. The load balance server 1 sends back the 200OK message to the presentity 3. Therefore, the presentity 3 completes a registration of the presence information to the presence server 2.

(S403) Then, a watcher 4 subscribes to the presence information of the presentity 3. In this case, the watcher 4 sends a SUBSCRIBE(INITIAL) message to the load balance server 1.

It is an example of this SUBSCRIBE message's format as follows:

| SUBSCRIBE sip:presentity@example.com | [PRS-URI] |
|---|---|
| SIP/2.0 Via SIP/2.0/UDP | |
| Event: | [EVENT NAME] |
| To:<sip:presentity@example.com> | [PRS-URI] |
| From:<sip:watcher@example.com> | [SIP URI OF WATCHER] |
| Expires: | [EFFECTIVE PERIOD OF SUBSCRIPTION] |
| Call-ID: | |
| CSeq: 1 SUBSCRIBE | |

(S404) Correspondingly, the load balance server 1 sends back a 302 Moved Temporarily of a SIP re-direct response to watcher 4. 302 Moved Temporarily includes SIP-URI of presence server 2 to register the presence information.

(S405) The watcher 4 sends a SUBSCRIBE(INITIAL) message to SIP-URI of the presence server 2 included in 302 Moved Temporarily by using re-direct.

(S406) Like an existing presence server, when the presence server 2 receives the SUBSCRIBE message from the watcher 4, it is sent back a 200OK message to the watcher 4. Presence server 2 registers the presence information because the PUBLISH(INITIAL) message is already received from the load balance server 1.

(S407) Then, the presence server 2 sends an NOTIFY message to the watcher 4. The NOTIFY message includes the presence information of the presentity 3.

It is an example of this NOTIFY message's format as follows:

| | |
|---|---|
| NOTIFY sip:watcher@example.com | [SIP URI OF WATCHER] |
| SIP/2.0 Via SIP/2.0/UDP | |
| Event: | [EVENT NAME] |
| To:<sip:watcher@example.com> | [SIP URI OF WATCHER] |
| From:<sip:presentity@example.com> | [PRS-URI] |
| Call-ID: | |
| CSeq: 1 NOTIFY | |
| Subscription-Status: active; expires= | [STATE AND EFFECTIVE PERIOD OF SUBSCRIPTION] |
| *snip* | |

<Presence Information>

(S408) The watcher 4 gets the presence information by receiving NOTIFY message. And, the watcher 4 sent back a 200OK message to presence server 2.

(S409) Subsequently, it is assumed that a lot of SUBSCRIBE messages requiring subscription of the presence information are sent from a lot of watchers 4. The SUBSCRIBE receiving rate to the presence servers 2 is watched by the load balance server 1. Then, the load of the presence server 2 rises. Therefore, secondly, the presence information is registered with other presence servers 2.

(S410) The watcher 4 sends a SUBSCRIBE message to the load balance server 1, and the message corresponds to the presence information of the presentity 3. The load balance server 1 adds a presence server to presence information of the presentity 3 newly. To get the presence information of the presentity 3, the load balance server 1 sends a SUBSCRIBE message to presence server 2, and the message corresponds to the presence information of presentity 3. The Expires (effective period) header of the SUBSCRIBE message is set by "zero". This does not mean update of the effective period.

It is an example of this SUBSCRIBE message's format as follows:

| | |
|---|---|
| SUBSCRIBE sip:presentity@example.com | [PRS-URI] |
| SIP/2.0 Via SIP/2.0/UDP | |
| Event: | [EVENT NAME] |
| To:<sip:presentity@example.com> | [PRS-URI] |
| From:<sip:load-balance@example.com> | |
| | [SIP URI OF LOAD BALANCE SERVER] |
| Expires: 0 | [EFFECTIVE PERIOD = 0 OF SUBSCRIPTION] |
| Call-ID: | |
| CSeq: 1 SUBSCRIBE | |

(S411) Correspondingly, the presence server 2 sends back a 200OK message to the load balance server 1.

(S412) Then, the presence server 2 sends an NOTIFY message to the load balance server 1. The NOTIFY message includes the presence information of the presentity 3.

It is an example of this NOTIFY message's format as follows:

| | |
|---|---|
| NOTIFY sip:load-balance@example.com | [SIP URI OF LOAD BALANCE SERVER] |
| SIP/2.0 Via SIP/2.0/UDP | |
| Event: | [EVENT NAME] |
| To:<sip:load-balance@example.com> | [SIP URI OF LOAD BALANCE SERVER] |
| From:<sip:presentity@example.com> | [PRS-URI] |
| Call-ID: | |
| CSeq: 1 NOTIFY | |
| Subscription-Status: terminated; expires = timeout | [STATE AND EFFECTIVE PERIOD OF SUBSCRIPTION] |
| *snip* | |

<Presence Information>

(S413) The load balance server 1 gets the presence information by receiving the NOTIFY message. And, a 200OK message is sent back to the presence server 2.

(S414) Here, the load balance server 1 selects another presence server P that the presence information should be registered. The SUBSCRIBE receiving rate of this presence server P is less than predetermined threshold Ts. And, load balance server 1 sends a PUBLISH(INITIAL) message including the presence information to the selected presence server P. Therefore, the presence information is registered with the presence server P of light-load. Further, a registration's effective period is set by using a publish database. An effective period same as other presence servers with the presence information is set.

It is an example of this PUBLISH message's format as follows:

| | |
|---|---|
| PUBLISH sip:presentity@example.com | [PRS-URI] |
| SIP/2.0 Via SIP/2.0/UDP | |
| Event: | [EVENT NAME] |
| To:<sip:presentity@example.com> | [PRS-URI] |
| From:<sip:presentity@example.com> | [PRS-URI] |
| Expires: | [EFFECTIVE PERIOD OF REGISTRATION] |
| Call-ID: | |
| CSeq: 1 PUBLISH | |

(S415) Correspondingly, the presence server P sends back a 200OK message to the load balance server 1.

(S416) After receiving the 200OK message, the load balance server 1 sends back 302 Moved Temporarily of SIP to the watcher 4. The 302 Moved Temporarily includes SIP-URI of presence server P that the presence information is registered newly.

(S417) After receiving the 302 Moved Temporarily, the watcher 4 sends a SUBSCRIBE message to the SIP-URI of the presence server P included in the 302 Moved Temporarily by using re-direct. That is to say, the SUBSCRIBE message is sent to the presence server directly without going through the load balance server 1.

(S418) Like an existing presence server, after receiving the SUBSCRIBE message from the watcher 4, the presence server P sends back a 200OK message to the watcher 4. The presence server P registers the presence information because the PUBLISH(INITIAL) message is already received from the load balance server 1.

(S419) Then, the presence server P sends an NOTIFY message to the watcher 4. The NOTIFY message includes the presence information of the presentity 3.

(S420) The watcher 4 gets the presence information by receiving the NOTIFY message. And, it sends back a 200OK message to the presence server 2. There is the case that a lot of watchers 4 send SUBSCRIBE messages of a specific presence information to one presence server.

According to FIG. 4, even in this case, a load of presence server is balanced by increasing the number of presence servers to register the presence information.

Figure 5:
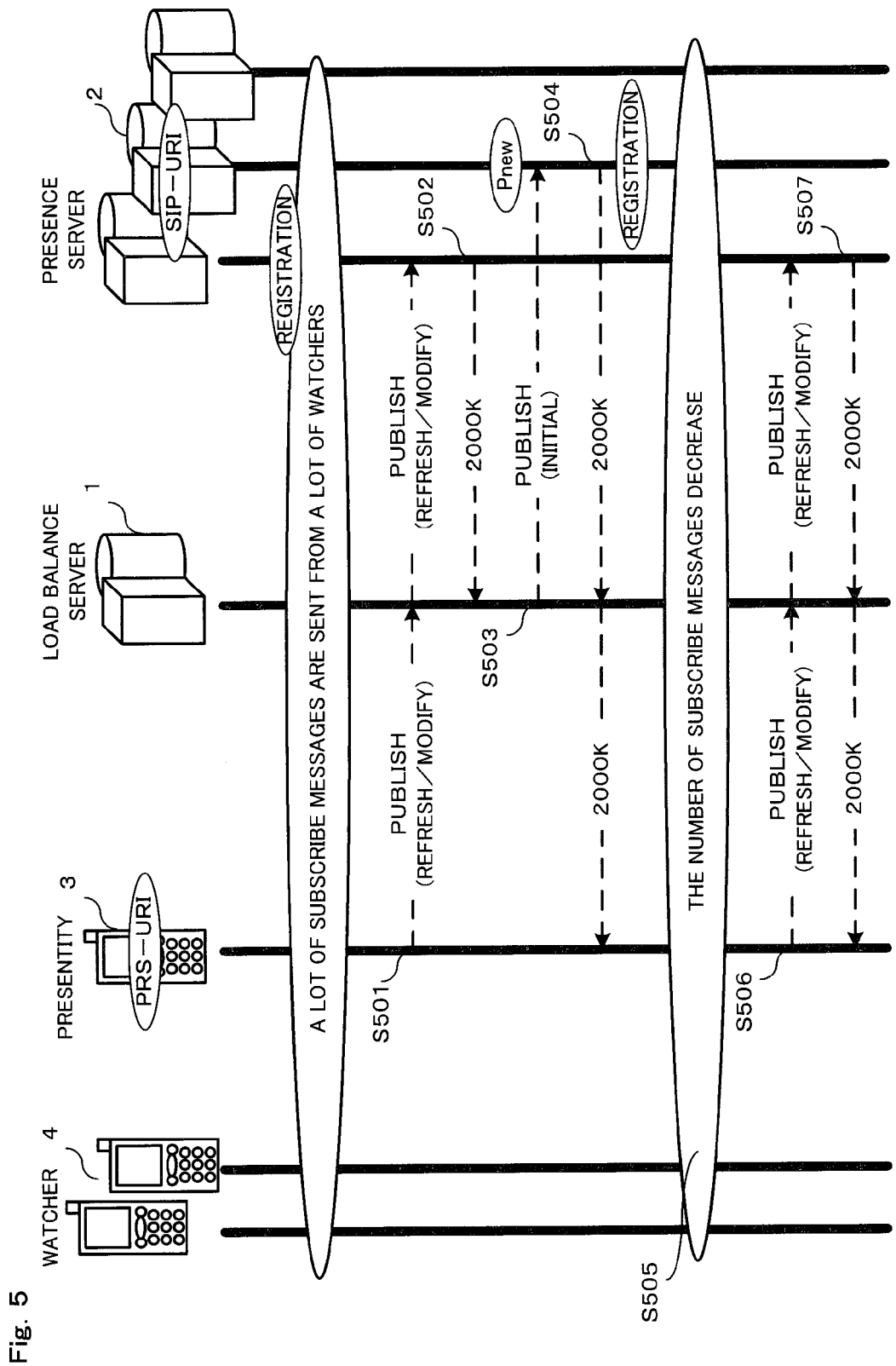
FIG. 5 is the second sequence diagram in the present invention.

FIG. 5 is the second sequence diagram in the present invention.

The PUBLISH messages are classified in three; INITIAL for new registration, REFRESH for update of effective period in registration of presence information, and MODIFY for modification of presence information. The PUBLISH(REFRESH/MODIFY) message adds a SIP-If-Match header. The PUBLISH(INITIAL) message does not add a SIP-If-Match header. The SIP-If-Match header of the PUBLISH(RE-FRESH/MODIFY) message stores the entity tag of the SIP-ETag header field in the 200OK message at the time of the INITIAL (the first time) registration. Therefore, presence server 2 and load balance server 1 recognize to be a PUBLISH message to the registered presence information.

The "SIP-If-Match" header specifies a SIP-ETag header value designated by PUBLISH response (200OK) about the event state published before. Event states of update, modification or deletion is identified by a PUBLISH message.

The "SIP-ETag" header is the entity tag (request identifier) which is generated by ESC (Event State Compositor) upon receiving the PUBLISH message.

FIG. 5 shows a sequence when the load balance server receives a PUBLISH(REFRESH/MODIFY).

(S501) The presentity 3 sends a PUBLISH(REFRESH/MODIFY) message to the load balance server 1 about re-registration and update of the already registered presence information. The load balance server 1 retrieves a presence server P that the presence information has been already registered. And, the PUBLISH(REFRESH/MODIFY) message is sent to the presence server P.

(S502) Correspondingly, the presence server P executes re-registration and update of the presence information of the presentity 3. And, the presence server P sends back a 200OK message to load balance server 1.

(S503) Then, the load balance server 1 retrieves SUBSCRIBE receiving rate of presence server P. When the SUBSCRIBE receiving rate is not less than predetermined threshold Ts, that is to say, when the presence server P is heavy-loaded, the presence information is registered with other presence servers 2.

Here, it is assumed that the SUBSCRIBE receiving rate of presence server P is not less than predetermined threshold Ts. Then, the load balance server 1 selects another presence server Pnew that the presence information should be registered. The SUBSCRIBE receiving rate of this presence server Pnew is less than predetermined threshold Ts. And, the load balance server 1 sends a PUBLISH(INITIAL) message including the presence information to the selected presence server Pnew. Then, one needs to be careful not to include a SIP-If-Match header. Therefore, the presence information can be registered with the presence server Pnew of light-load.

(S504) The presence server Pnew sends back a 200OK message to the load balance server 1. Also, the load balance server 1 stores the entity tag of the SIP-ETag header field of the 200OK message in the subscribe database. And, the 200OK message is sent back to the presentity 3. This presentity 3 is the source of the PUBLISH(REFRESH/MODIFY) message that a representative entity tag is given to the SIP-If-Match header. A representative entity tag may be an entity tag of the SIP-ETag header field included in a 200OK message received from the presence server that received the PUBLISH message first. For example, in this case, the 200OK message of the presence server P corresponds. Also, the load balance server 1 may generate individually.

(S505) Subsequently, it is assumed that the number of SUBSCRIBE messages requiring subscription of the presence information decreased. The maximum of the effective period of subscription to the presence server 2 is watched by the load balance server 1.

When the number of SUBSCRIBE messages decreases, effective period of SUBSCRIBE stored to the subscribe database 103 may be expires for current time. This means that there is not subscription to the presence information for presence servers 2. Then, the load balance server 1 deletes the presence server 2 from the entry, and the presence server is that the effective period expires for current time. Subsequently, when the load balance server 1 receives a PUBLISH(REFRESH/MODIFY) message from the presentity 3 and a SUBSCRIBE message from the watcher 4, the message is not sent to presence server 2 deleted from the entry. But, the load balance server 1 leaves at least one presence server to register each presence information.

(S506) The presentity 3 sends a PUBLISH(REFRESH/MODIFY) message to the load balance server 1 about re-registration and update of the already registered presence information.

The load balance server 1 retrieves presence server P that the presence information is already registered. And, the PUBLISH(REFRESH/MODIFY) message is sent to the presence server P.

(S507) Correspondingly, the presence server P registers the presence information. And, the presence server P sends back a 200OK message to the load balance server 1. Also, the load balance server 1 sends back a 200OK message to the presentity 3 that sent a PUBLISH(REFRESH/MODIFY) message.

Here, a sending/receiving method of PUBLISH message and 200OK message is explained. There are a case by using the DSR method with MAC (Media Access Control) address translation and a case by using the NAT method with IP address translation.

[A Case Using the DSR Method with MAC Address Translation]

Load balance server 1 and presence server 2 is connected to the same link.

(1) PUBLISH message that load balance server 1 sends to presence server 2

Destination MAC address of the PUBLISH message:
MAC address of presence server 2
Destination IP address:
IP address of load balance server 1
IP address same as the load balance server 1 is given to loopback interface of the presence server 2. Thus, the presence server 2 can receive this PUBLISH message.

(2) 200OK message that presence server 2 sends to presentity 3

Source MAC address of 200OK message:
MAC address of presence server P
Source IP address:
IP address of load balance server 1
The destination IP address refers to the presentity (or proxy server). Therefore, the 200OK message arrives at the presentity 3 directly.

[A Case Using the NAT Method with IP Address Translation]

(1) PUBLISH message that load balance server 1 sends to presence server 2

Destination IP address of SUBSCRIBE message sent from a watcher:
IP address of presence server 2

(2) 200OK message that presence server 2 sends to presentity 3

There is a load balance server 1 in a default route of presence server 2. Or, there is as a SIP proxy of 200OK message to PUBLISH message in presence server 2. The load balance server 1 sends a 200OK message received from a presence server to the presentity. In this case, the source IP address of the 200OK message is translated into the IP address of the load balance server.

Then, a sending/receiving method of SUBSCRIBE messages and NOTIFY messages is explained.

[A Case Using the DSR Method with MAC Address Translation]

(1) When a dialogue of SUBSCRIBE is not generated, a presence server 2 sending a SUBSCRIBE message is determined. This is similar in the case of 302 Moved Temporarily.

(2) When a dialogue of SUBSCRIBE is generated, the presence server 2 corresponding to the dialogue is retrieved from subscribe database 103 (cf. table 4).

(3) SUBSCRIBE message that load balance server 1 sends to presence server 2
Destination MAC address of SUBSCRIBE message:
MAC address of presence server P
Destination IP address:
IP address of load balance server 1
IP address same as load balance server is given to loopback interface of presence server 2. Therefore, the load balance server can receive a SUBSCRIBE message.

(4) After load balance server 1 sends a SUBSCRIBE message to presence server 2, the dialogue information is recorded to subscribe database 103.

(5) 200OK message that presence server P sends to watcher
Source MAC address of 200OK message:
MAC address of presence server 2
Source IP address:
IP address of load balance server 1
Destination IP address refers to the watcher (or proxy server). Therefore, the 200OK message arrives at the watcher directly.

[A Case by Using the NAT Method with IP Address Translation]

(1) When a dialogue of SUBSCRIBE is not generated, presence server 2 sending a SUBSCRIBE message is determined. This is similar in the case of 302 Moved Temporarily.

(2) When a dialogue of SUBSCRIBE is generated, presence server 2 corresponding to the dialogue is retrieved from subscribe database 103 (cf. table 4).

(3) The SUBSCRIBE message which load balance server 1 sends to presence server P
Destination IP address of SUBSCRIBE message:
IP address of presence server P corresponding to the dialogue (4) 200OK message that presence server P sends to the watcher
There is load balance server 1 in a default route of presence server P. When the load balance server 1 receives the 200OK message, it translates the source IP address into the IP address of the load balance server 1. And the load balance server 1 sends the 200OK message to the watcher.

Figure 6:
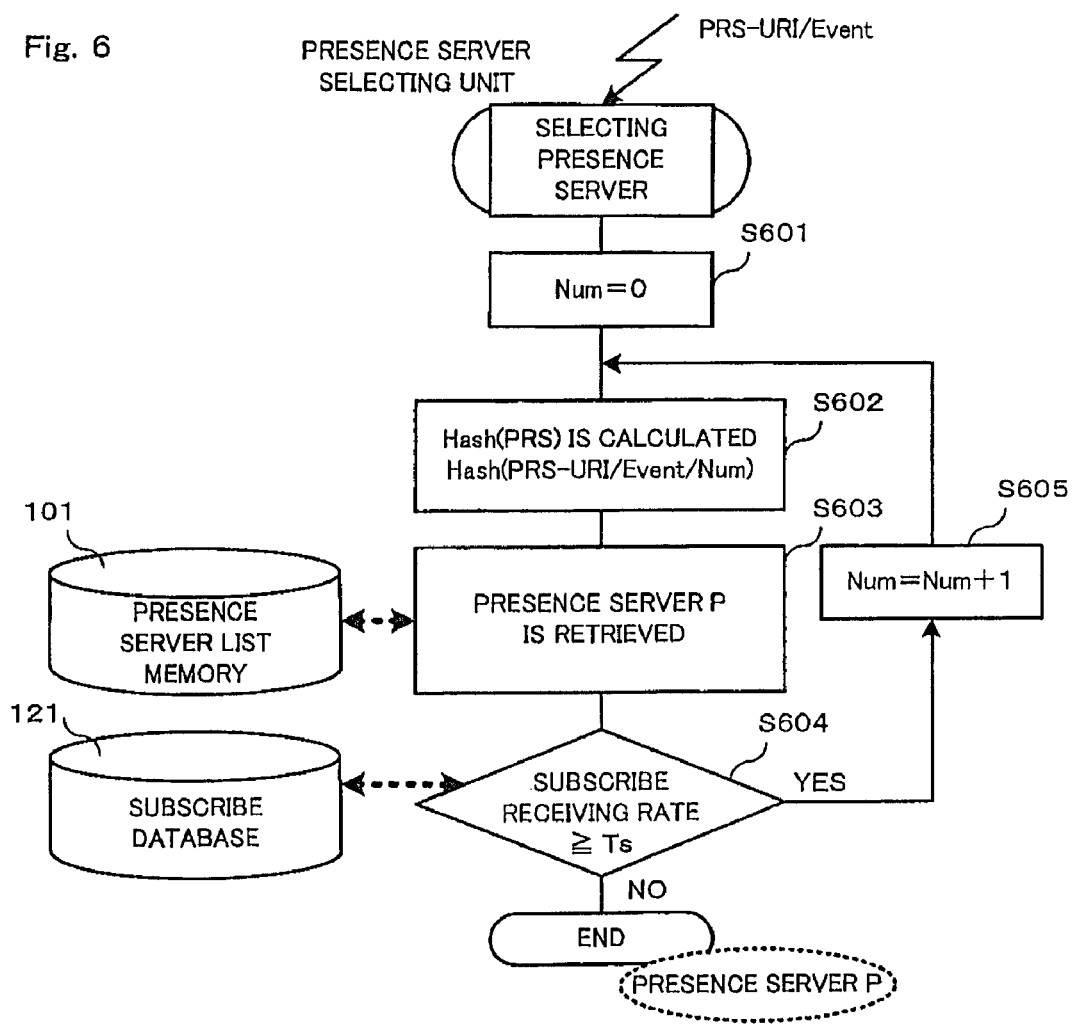
FIG. 6 is a flow chart of the presence server selecting unit in the present invention.

FIG. 6 is a flow chart of the presence server selecting unit in the present invention.

PRS-URI and Event are input into presence server selecting unit.

(S601) First, Num flag is set in zero.

(S602) Hash value Hash(PRS) is calculated. For example, an argument of the hash function is as follows:

Hash(PRS)=Hash(PRS-URI/Event/Num)

The "/", is a delimiter character.

Here, the presence server list memory 101 is retrieved. In correspondence with presence server URI (SIP-URI), the hash value Hash(SIP-URI) of argument SIP-URI is recorded.

(S603) Then, a presence server having a Hash(SIP-URI) that is the nearest to the Hash(PRS) is retrieved. The retrieved presence server becomes a presence server P.

(S604) Then, the load balance server 1 determines whether the SUBSCRIBE receiving rate (the total SUBSCRIBE number of per unit of time) in presence server P recorded to subscribe database 103 is lower than predetermined threshold Ts. Here, when it is higher than predetermined threshold Ts, a lot of SUBSCRIBE messages concentrates on to the presence server P. Therefore, it is thought that it is necessary to select other presence servers.

(S605) When SUBSCRIBE receiving rate is higher than predetermined threshold Ts, Num 1 is incremented. Therefore, hash value Hash(PRS) calculated secondly becomes the different value. As a result, other presence server P is selected. Thus, till presence server P is detected, one increase of Num is repeated.

Finally, presence server P that SUBSCRIBE receiving rate is less than predetermined threshold Ts is selected.

Figure 7:
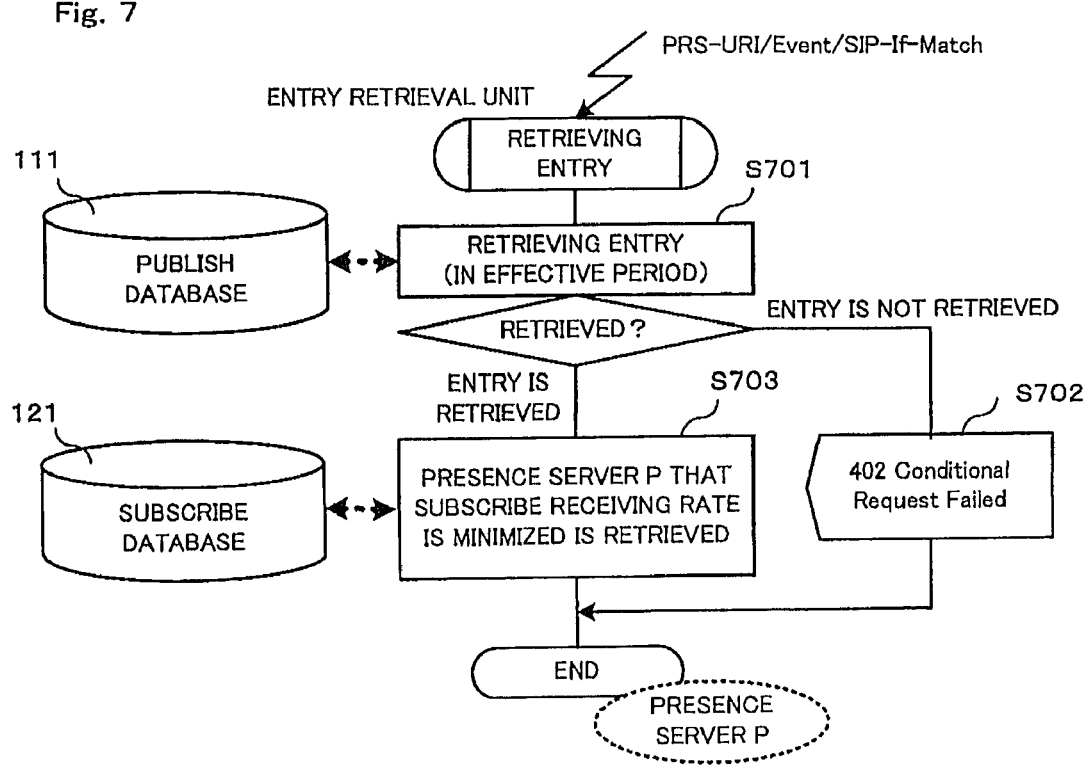
FIG. 7 is a flow chart of the entry retrieval unit in the present invention.

FIG. 7 is a flow chart of the entry retrieval unit in the present invention.

PRS-URI, Event and the entity tag of the SIP-If-Match header field are input into the entry retrieval unit.

(S701) First, an entry according to PRS-URI, Event and entity tag from the publish database 102 is retrieved. Then, it is necessary that there is current time in effective period included in the entry. Further, it is necessary that the entity tag of SIP-If-Match header field is the same as the representative entity tag of the entry.

(S702) It is assumed that an object entry is not retrieved by the publish database 102. In this case, 402 Conditional Request Failed is sent back to the presentity 3.

(S703) It is assumed that an object entry is retrieved by publish database 102. In this case, by using subscribe database 103, presence server P that SUBSCRIBE receiving rate is minimized in presence servers included in the entry is retrieved.

Figure 8:
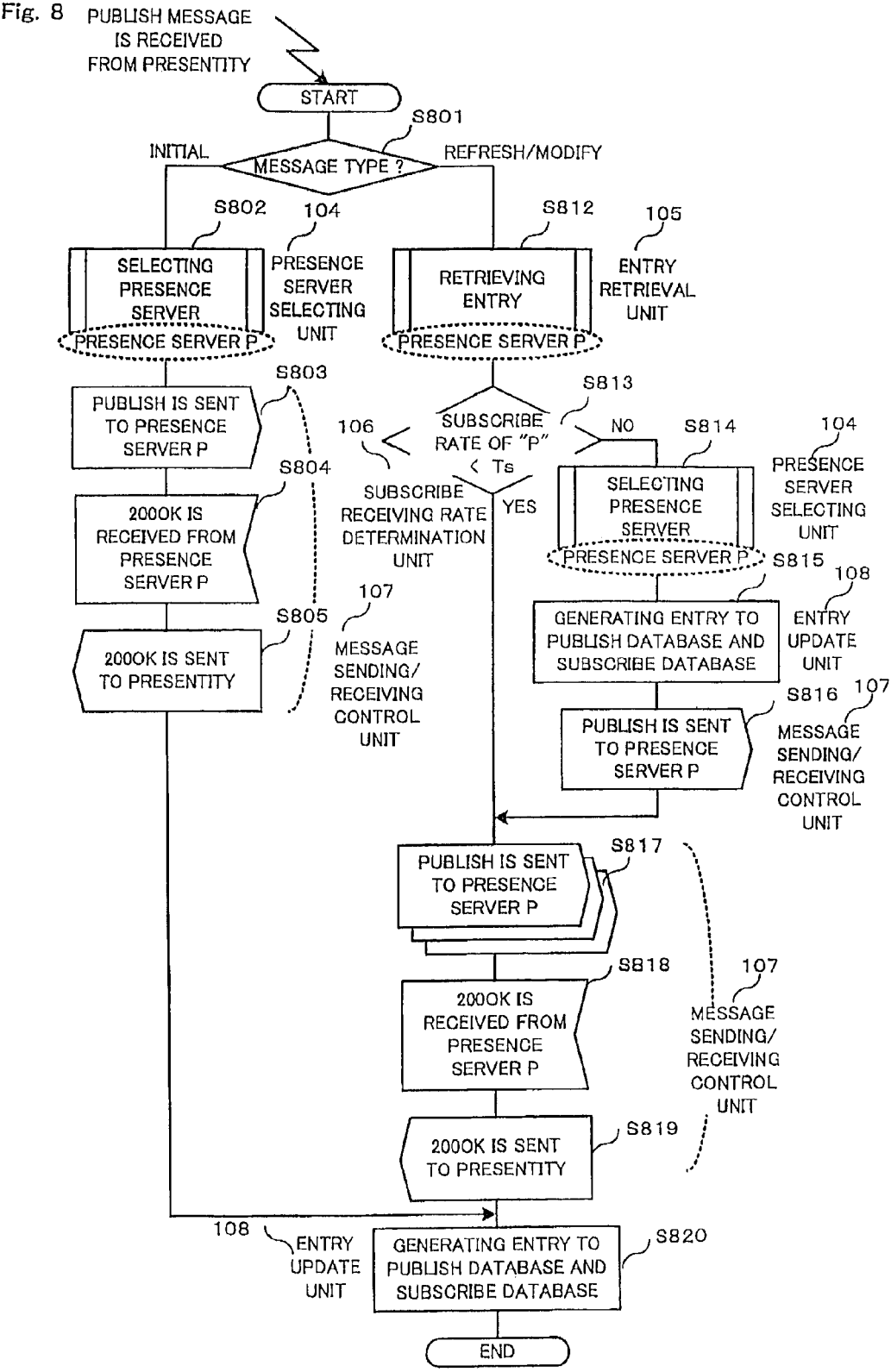
FIG. 8 is a flow chart of the load balance server when a PUBLISH message is received.

FIG. 8 is a flow chart of the load balance server when a PUBLISH message is received.

(S801) It is determined whether the received PUBLISH message is INITIAL or REFRESH/MODIFY. The PUBLISH message without a SIP-If-Match header is determined with INITIAL.

(S802) When it is the PUBLISH(INITIAL) message, the presence information is unregistered. Therefore, by presence server selecting processing (cf. FIG. 6), a presence server P is selected. The SUBSCRIBE receiving rate of the presence server P is less than predetermined threshold Ts.

(S803) A PUBLISH(INITIAL) message is sent to the presence server P.

(S804) And, the load balance server 1 waits for the receiving of a 200OK message from the presence server P.

(S805) When the 200OK message is received from the presence server P, the load balance server 1 sends back a 200OK message to the presentity 3.

(S806) Therefore, the load balance server 1 recognizes that the presence information of the presentity is registered with the presence server P. Then, by using the publish database 102 of the load balance server 1, an entry of PRS-URI and Event is retrieved. And, a SIP-URI of the presence server P and an entity tag included in the SIP-ETag header field of the 200OK message are recorded in the entry.

Also, current time and the value of the Expires header field of the 200OK message are added. When the value is bigger than the effective period (=initial value zero), the value is input into effective period. Also, the value of the Expires header field of the 200OK message sent to the presentity is input into the representative entity tag.

(S812) In the case of a PUBLISH(REFRESH/MODIFY) message, presence server P is selected by the entry retrieval processing (cf. FIG. 7).

(S813) Then, it is determined whether SUBSCRIBE receiving rate in presence server P recorded to the subscribe database 103 is lower than predetermined threshold Ts.

(S814) When the SUBSCRIBE receiving rate of the presence server P is not less than predetermined threshold Ts, that is to say, when a lot of SUBSCRIBE messages is received intensively by the presence server P, the presence server selecting processing (cf. FIG. 6) is executed. Therefore, an additional presence server Pnew is selected.

(S815) About the publish database 102 and the subscribe database 103, identifier (SIP-URI) of additional presence server Pnew is added to the entry based on the presence information. Then, the entity tag is empty.

(S816) A PUBLISH(INITIAL) message is sent to the additional presence server Pnew. The SIP-If-Match header of the PUBLISH message is deleted.

(S817) There is a case when the SUBSCRIBE receiving rate in the presence server P is less than predetermined threshold Ts by S813, or when the additional presence server Pnew is selected. In this case, by using the publish database 102, a PUBLISH message is sent to all SIP-URI recorded in the entry based on the presence information (that is to say, to all presence servers). But, entity tags corresponding to each presence server is retrieved from the publish database 102, and the entity tag is stored in the SIP-If-Match header field in the PUBLISH message.

(S818) It waits for receiving of a 200OK message from either one presence server.

(S819) When a 200OK message is received from either one presence server, the 200OK message is sent back to the presentity 3. Then, the representative entity tag is stored to the SIP-ETag header field of the 200OK message.

(S820) At the last, for the publish database 102 and the subscribe database 103, the effective period corresponding to the presence server URI is updated based on PRS-URI and Event.

This is the value that added the value of the Expires header field in the 200OK message to current time. Also, the entity tag of a SIP-ETag header field included in the 200OK message received from the additional presence server Pnew is stored in an entity tag of the server Pnew.

FIG. 9 is a flow chart of the load balance server when a SUBSCRIBE message is received.

The load balance server 1 receives a SUBSCRIBE message to subscribe to presence information from watcher 4.

(S901) Based on PRS-URI and Event included in the SUBSCRIBE message, a presence server P is retrieved by the entry retrieval processing (cf. FIG. 7).

(S902) It is determined whether the SUBSCRIBE receiving rate of the retrieved presence server P is less than predetermined threshold Ts.

(S903) When the SUBSCRIBE receiving rate is higher than predetermined threshold Ts, a presence server storing the presence information is added. Therefore, it is balanced load to the presence information. That is to say, when a lot of SUBSCRIBE messages are received intensively by presence server P, an additional presence server is selected. Here, the presence server selecting processing (cf. FIG. 6) is executed. Therefore, an additional presence server Pnew is selected.

(S904) The PUBLISH(INITIAL) message including the presence information is sent to the additional presence server Pnew. Then, like S410-S414 of FIG. 4, it is preferable to send the SUBSCRIBE message (Expires=0) to the presence server P. Therefore, the presence information included in the body-part of the received NOTIFY message can be obtained without waiting for receiving PUBLISH(REFRESH/MODIFY) from watcher 4.

Also, the load balance server 1 may store a PUBLISH message received from watcher 4 for the last time about presence information corresponding to each representative entity tag. Then, the SIP-If-Match header is deleted by the PUBLISH message, it becomes INITIAL. Also, the value that subtracted the current time from effective period in the publish database 102 is calculated. The value is stored in an Expires header field.

(S905) It waits for the receiving of a 200OK message from the additional presence server Pnew.

(S906) When a 200OK message is received from the additional presence server Pnew, SIP-URI of additional presence server Pnew is added to the entry based on PRS-URI and Event to publish database 112 and subscribe database 103. Also, the entity tag of the SIP-ETag header field in the 200OK message is added.

(S907) There is a case when SUBSCRIBE receiving rate of the retrieved presence server P is lower than predetermined threshold Ts, or an additional presence server Pnew is added to. In this case, 302 Moved Temporarily to the presence server P or Pnew is sent to the watcher 4. Therefore, a re-direct to presence server P or Pnew is recommended to the watcher 4.

(S908) The SUBSCRIBE receiving rate to subscribe database 103 is updated. Also, the effective period in presence server P or Pnew is updated too. When the time that added the value of the Expires header field of the SUBSCRIBE message to current time is bigger than effective period (=initial value zero), the time is input as effective period.

According to the load balance server of the present invention, even if a lot of SUBSCRIBE messages to the specific presence information are sent intensively, load of the presence information is balanced by increasing the number of presence servers to register the presence information.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A load balance server for communicating with a first communication apparatus, a second communication apparatus and a plurality of presence servers, wherein the first communication apparatus sends a public message to register presence information, the second communication apparatus sends a subscription message subscribing presence information, and each presence server registers presence information included in a received public message, and sends a report message including the presence information to a source apparatus of a received subscription message, the load balance server comprising:

a first database for recording a list of identifiers of ones of the presence servers that register the presence information with an entry, a second database for recording a subscription message receiving rate for each presence server, an entry retrieval means for selecting, as a reference presence server, a presence server having the subscription message receiving rate which is the lowest, among ones of the presence servers which are included in the list of the entry based on the presence information, when the load balance server receives the subscription message from the second communication apparatus or when the load balance server receives the public message from the first communication apparatus, a presence server selecting means for selecting, from the presence servers, an additional presence server having the subscription message receiving rate which is lower than a predetermined threshold Ts, when the subscription message receiving rate of the selected reference presence server is higher than the predetermined threshold Ts, and a message sending/receiving control means for sending the public message to the selected additional presence server, and ones of the presence servers which are included in the list.

2. The load balance server as claimed in claim 1, wherein the load balance server is equipped in a presence system using SIP/SIMPLE,
the public message is a PUBLISH message,
the subscription message is a SUBSCRIBE message,
the report message is a NOTIFY message,
the first database is a publish database, and
the second database is a subscribe database.

3. The load balance server as claimed in claim 1, wherein the presence server selecting means
selects a presence server from the plurality of presence servers using a corresponding hash value into which part of the presence information is converted using a hash function,
determines whether the subscription message receiving rate of the selected presence server is lower than the predetermined threshold Ts, and
repeats the selecting of the presence server until it is determined that the subscription message receiving rate of the selected presence server is lower than the predetermined threshold Ts.

4. The load balance server as claimed in claim 1, wherein the message sending/receiving control means, for the subscription message to be sent from the second communication apparatus to at least one of the presence servers, sends back a re-direct request including an address of the at least one presence server to the second communication apparatus, sends a subscription message to the at least one presence server by DSR method or NAT method.

5. The load balance server as claimed in claim 1, wherein the message sending/receiving control means, upon reception of the subscription message from the second communication apparatus, sends the subscription message to any one of the presence servers included in the list of the entry based on the presence information, receives presence information from the presence server by the report message, and sends the public message including the presence information to the additional presence server.

6. The load balance server as claimed in claim 1, wherein the message sending/receiving control means, upon reception of the public message from the first communication apparatus, sends the public message to all presence servers included in the list of the entry based on the presence information, and sends the public message to the additional presence server.

7. The load balance server as claimed in claim 1, wherein
the second database further includes an effective period in each presence information, and
the entry retrieval means deletes presence servers from the list of the entry, and the presence servers is that the effective period of the subscription message stored in the second database expires for current time.

8. A method for operating a computer to function as a load balance server for communicating with a first communication apparatus, a second communication apparatus and a plurality of presence servers,
wherein the first communication apparatus sends a public message to register presence information,
the second communication apparatus sends a subscription message subscribing presence information,
each presence server registers presence information included in a received public message, and sends a report message including the presence information to a source apparatus of a received subscription message, and
the load balance server has a first database for recording a list of identifiers of ones of the presence servers that register the presence information with an entry, and a second database for recording a subscription message receiving rate for each presence server, the method comprising the steps of:
selecting, as a reference presence server, a presence server having the subscription message receiving rate which is the lowest, among ones of the presence servers which are included in the list of the entry based on the presence information, when the subscription message is received from the second communication apparatus or when the public message is received from the first communication apparatus,
selecting, from the presence servers, an additional presence server having the subscription message receiving rate which is lower than a predetermined threshold Ts, when the subscription message receiving rate of the selected reference presence server is higher than the predetermined threshold Ts, and
sending the public message to the selected additional presence server, and ones of the presence servers which are included in the list.

* * * * *